United States Patent
Karaushi et al.

(10) Patent No.: US 12,443,194 B2
(45) Date of Patent: Oct. 14, 2025

(54) AUTONOMOUS MOBILE ROBOT LINKAGE SYSTEM AND AUTONOMOUS MOBILE ROBOT

(71) Applicant: THK CO., LTD., Tokyo (JP)

(72) Inventors: Takeo Karaushi, Tokyo (JP); Kosei Mochizuki, Tokyo (JP); Hitoshi Kitano, Tokyo (JP)

(73) Assignee: THK CO., LTD., Tokyo (JP)

( * ) Notice: Subject to any disclaimer, the term of this patent is extended or adjusted under 35 U.S.C. 154(b) by 249 days.

(21) Appl. No.: 18/009,814

(22) PCT Filed: Jun. 22, 2021

(86) PCT No.: PCT/JP2021/023569
§ 371 (c)(1),
(2) Date: Dec. 12, 2022

(87) PCT Pub. No.: WO2021/261480
PCT Pub. Date: Dec. 30, 2021

(65) Prior Publication Data
US 2023/0288939 A1    Sep. 14, 2023

(30) Foreign Application Priority Data
Jun. 23, 2020   (JP) ................. 2020-107952

(51) Int. Cl.
*G05D 1/00*   (2024.01)

(52) U.S. Cl.
CPC ......... *G05D 1/0225* (2013.01); *G05D 1/0234* (2013.01); *G05D 1/0246* (2013.01); *G05D 1/0289* (2013.01)

(58) Field of Classification Search
CPC .. G05D 1/0225; G05D 1/0234; G05D 1/0246; G05D 1/0289
See application file for complete search history.

(56) References Cited

U.S. PATENT DOCUMENTS

| | | | |
|---|---|---|---|
| 10,011,016 B1* | 7/2018 | Rembisz | B25J 11/0085 |
| 2010/0174436 A1* | 7/2010 | Matsunaga | G05D 1/0212 |
| | | | 701/26 |

(Continued)

FOREIGN PATENT DOCUMENTS

| | | |
|---|---|---|
| CN | 106600887 A | 4/2017 |
| CN | 107193280 A | 9/2017 |

(Continued)

OTHER PUBLICATIONS

Machine translation of JP2006178578 (Year: 2006).*

(Continued)

*Primary Examiner* — Mohamad O El Sayah
(74) *Attorney, Agent, or Firm* — WHDA, LLP

(57) ABSTRACT

An autonomous mobile robot linkage system (1) includes a plurality of sign posts (SP0 to SP2) disposed along a travel path (10); an autonomous mobile robot (20) which moves along the travel path (10) while reading the plurality of sign posts (SP0 to SP2) in order using a camera and performs predetermined operations in order of pre-set operation numbers based on identification numbers read from the sign posts (SP0 to SP2); and a host device (30) which receives information on the operation number being executed from the autonomous mobile robot (20) and generates an event on the travel path (10) based on the operation number.

10 Claims, 16 Drawing Sheets

(56) References Cited

U.S. PATENT DOCUMENTS

| | | | |
|---|---|---|---|
| 2010/0188510 A1* | 7/2010 | Yoo | G06T 7/70 901/1 |
| 2012/0277909 A1* | 11/2012 | Ouchi | B25J 9/1661 700/254 |
| 2014/0214394 A1* | 7/2014 | Inoue | G06F 30/20 703/13 |
| 2015/0127124 A1* | 5/2015 | Kobayashi | G05B 19/409 700/83 |
| 2015/0293533 A1* | 10/2015 | Ebrahimi Afrouzi | G05D 1/0214 701/2 |
| 2016/0246302 A1 | 8/2016 | Liao et al. | |
| 2018/0096596 A1* | 4/2018 | Lee | G08G 1/096791 |
| 2018/0272882 A1* | 9/2018 | Fontana | B60L 53/60 |
| 2018/0353041 A1* | 12/2018 | Erkek | A47L 11/24 |
| 2019/0219409 A1* | 7/2019 | Tan | G01C 21/3453 |
| 2020/0072619 A1 | 3/2020 | Fukui | |
| 2020/0073394 A1* | 3/2020 | Igarashi | H04B 5/77 |
| 2020/0348683 A1* | 11/2020 | Hu | B25J 13/089 |
| 2021/0046650 A1* | 2/2021 | Deyle | G05D 1/0214 |
| 2021/0382494 A1* | 12/2021 | Park | G05D 1/0238 |

FOREIGN PATENT DOCUMENTS

| | | |
|---|---|---|
| CN | 109008779 A | 12/2018 |
| CN | 109202909 A | 1/2019 |
| JP | 2005-148960 A | 6/2005 |
| JP | 2006-178578 A | 7/2006 |
| JP | 2007-220012 A | 8/2007 |
| JP | 2019-003627 A | 1/2019 |
| JP | 2019-102047 A | 6/2019 |
| JP | 2019-207463 A | 12/2019 |
| TW | 201527966 A | 7/2015 |
| WO | 2018/189770 A1 | 10/2018 |

OTHER PUBLICATIONS

Office Action dated Sep. 11, 2024, issued in counterpart TW Application No. 110122784 with Partial English translation. (7 pages).

International Search Report dated Aug. 31, 2021, issued in counterpart International Application No. PCT/JP2021/023569.

Office Action dated Jun. 25, 2024, issued in counterpart CN Application No. 202180043467.2, with English translation. (23 pages).

* cited by examiner

FIG. 6

| | OPERATION | PARAMETER | | | | | EVENT ISSUE |
|---|---|---|---|---|---|---|---|
| | | SIGN POST SIZE /OPERATION | SIGN POST No./ ROTATION ANGLE | FOLLOWING DIRECTION | SIGN POST LEFT-RIGHT DISTANCE | SIGN POST FRONT-REAR DISTANCE | |
| 0 | START | | | | | | FORWARD MOVEMENT |
| 1 | SIGN POST | M | 0 | FRONT | 0 | 2 | SHUTTER OPEN |
| 2 | FORWARD MOVEMENT | 2 | | | | | |
| 3 | SIGN POST | M | 1 | FRONT | 0 | 2 | |
| 4 | ROTATION | RIGHT ROTATION | 90 | | | | |
| 5 | SIGN POST | M | 2 | FRONT | 0 | 2 | SHUTTER CLOSE |
| 6 | ROTATION | RIGHT ROTATION | 180 | | | | |
| 7 | GOAL | | | | | | GOAL NOTIFICATION |

FIG. 10

|   | \<GOING PATH\> | \<RETURNING PATH\> |
|---|---|---|
| ① | 0 00001 | 1 00001 |
| ② | 0 00010 | 1 00010 |
| ③ | 0 00011 | 1 00011 |
| ④ | 0 00100 | 1 00100 |
| ⑤ | 0 00101 | 1 00101 |
| ⑥ | 0 00111 | 1 00111 |
| ⑦ | 0 01000 | 1 01000 |
| ⑧ | 0 01001 | 1 01001 |

FIG. 12

| | OPERATION | PARAMETER | | | | | EVENT ISSUE |
|---|---|---|---|---|---|---|---|
| | | SIGN POST SIZE /OPERATION | SIGN POST No. /ROTATION ANGLE | FOLLOWING DIRECTION | SIGN POST LEFT-RIGHT DISTANCE | SIGN POST FRONT-REAR DISTANCE | |
| 0 | START | | | | | | FORWARD MOVEMENT |
| 1 | SIGN POST | M | 0 | | | | |
| 2 | FORWARD MOVEMENT | 2 | | FRONT | 0 | 2 | INTERSECTION CONTROL 1 |
| 3 | SIGN POST | M | 1 | | | | |
| 4 | ROTATION | RIGHT ROTATION | 90 | | | | |
| 5 | FORWARD MOVEMENT | 2 | | FRONT | 0 | 2 | INTERSECTION CONTROL 2 |
| 6 | SIGN POST | M | 2 | | | | |
| 7 | ROTATION | RIGHT ROTATION | 90 | | | | |
| 8 | FORWARD MOVEMENT | 2 | | FRONT | 0 | 2 | |
| 9 | GOAL | | | | | | GOAL NOTIFICATION |

FIG. 15

| | OPERATION | PARAMETER | | | | | EVENT ISSUE |
|---|---|---|---|---|---|---|---|
| | | SIGN POST SIZE /OPERATION | SIGN POST No./ ROTATION ANGLE | FOLLOWING DIRECTION | SIGN POST LEFT-RIGHT DISTANCE | SIGN POST FRONT-REAR DISTANCE | |
| 0 | START | | | | | | FORWARD MOVEMENT |
| 1 | SIGN POST | M | 0 | FRONT | 0 | 2 | |
| 2 | WAITING | | | | | | WIRELESS CHARGING CONTROL 1 |
| 3 | FORWARD MOVEMENT | | | | | | |
| 4 | SIGN POST | M | 1 | FRONT | 0 | 2 | |
| 5 | ROTATION | RIGHT ROTATION | 90 | | | | |
| 6 | WAITING | | | | | | WIRELESS CHARGING CONTROL 2 |
| 7 | FORWARD MOVEMENT | | | | | | |
| 8 | SIGN POST | M | 2 | FRONT | 0 | 2 | |
| 9 | ROTATION | RIGHT ROTATION | 180 | | | | |
| 10 | GOAL | | | | | | GOAL NOTIFICATION |

AUTONOMOUS MOBILE ROBOT LINKAGE SYSTEM AND AUTONOMOUS MOBILE ROBOT

TECHNICAL FIELD

The present invention relates to an autonomous mobile robot linkage system and an autonomous mobile robot.

Priority is claimed on Japanese Patent Application No. 2020-107952, filed Jun. 23, 2020, the content of which is incorporated herein by reference.

BACKGROUND ART

Patent Document 1 below discloses a system including an unmanned traveling vehicle which autonomously moves in an environment, in particular, a cleaning robot, and a door positioned in the environment and having a door frame and a hatch. The traveling vehicle has a detection device for detecting object data in the environment. The door has an electronic actuator for changing the open state of the door such that the traveling vehicle can open the door without the door being manually operated. A control device provided in the traveling vehicle outputs a control command for operating the electronic actuator according to the operation state of the traveling vehicle and the position of the traveling vehicle.

CITATION LIST

Patent Document

[Patent Document 1]
Japanese Unexamined Patent Application, First Publication No. 2019-3627

SUMMARY OF INVENTION

Technical Problem

Incidentally, the traveling vehicle of the related art has a computing means for creating an area map based on the object data detected by the detection device. This area map or a file linked to the area map contains information on the spatial position of the door in the environment. Such a simultaneous localization and mapping (SLAM) method requires advanced knowledge and complicated effort to change the area settings.

Further, as another method, there is a tape method in which a magnetic tape is used to form a travel path of a traveling vehicle and an ID tag, an auxiliary tape, or the like is used to generate an event. However, in this method, since a location where the event is generated is limited to a location where the ID tag or the auxiliary tape is pasted, effort is required to change the location where the event is generated.

The present invention is to provide an autonomous mobile robot linkage system and an autonomous mobile robot that is capable of generating an event on a travel path at an arbitrary timing without requiring advanced knowledge or complicated effort by simply disposing signs along the travel path.

Solution to Problem

According to a first aspect of the present invention, an autonomous mobile robot linkage system including: a plurality of signs disposed along a travel path; an autonomous mobile robot which moves along the travel path while reading the plurality of signs in order using a camera and performs predetermined operations in order of pre-set operation numbers based on identification numbers read from the signs; and a host device which receives information on the operation number being executed from the autonomous mobile robot and generates an event on the travel path based on the operation number is provided.

According to a second aspect of the present invention, an autonomous mobile robot which moves along a travel path while reading a plurality of signs disposed along the travel path in order using a camera and performs predetermined operations in order of pre-set operation numbers based on identification numbers read from the signs, the autonomous mobile robot including: an event generating unit which generates an event on the travel path based on the operation number being executed is provided.

Advantageous Effects of Invention

According to the autonomous mobile robot linkage system and the autonomous mobile robot described above, it is possible to generate an event on a travel path at an arbitrary timing without requiring advanced knowledge or complicated effort by simply disposing signs along the travel path.

BRIEF DESCRIPTION OF DRAWINGS

FIG. 6 is a diagram showing an operation table of the autonomous mobile robot in the first embodiment of the present invention.

FIG. 10 is an example of serial communication performed in the autonomous mobile robot linkage system shown in FIG. 9.

FIG. 12 is a diagram showing an operation table of the autonomous mobile robot in the second embodiment of the present invention.

FIG. 15 is a diagram showing an operation table of the autonomous mobile robot in the third embodiment of the present invention.

DESCRIPTION OF EMBODIMENTS

Hereinafter, embodiments of the present invention are described with reference to the drawings.

First Embodiment

Figure 1:
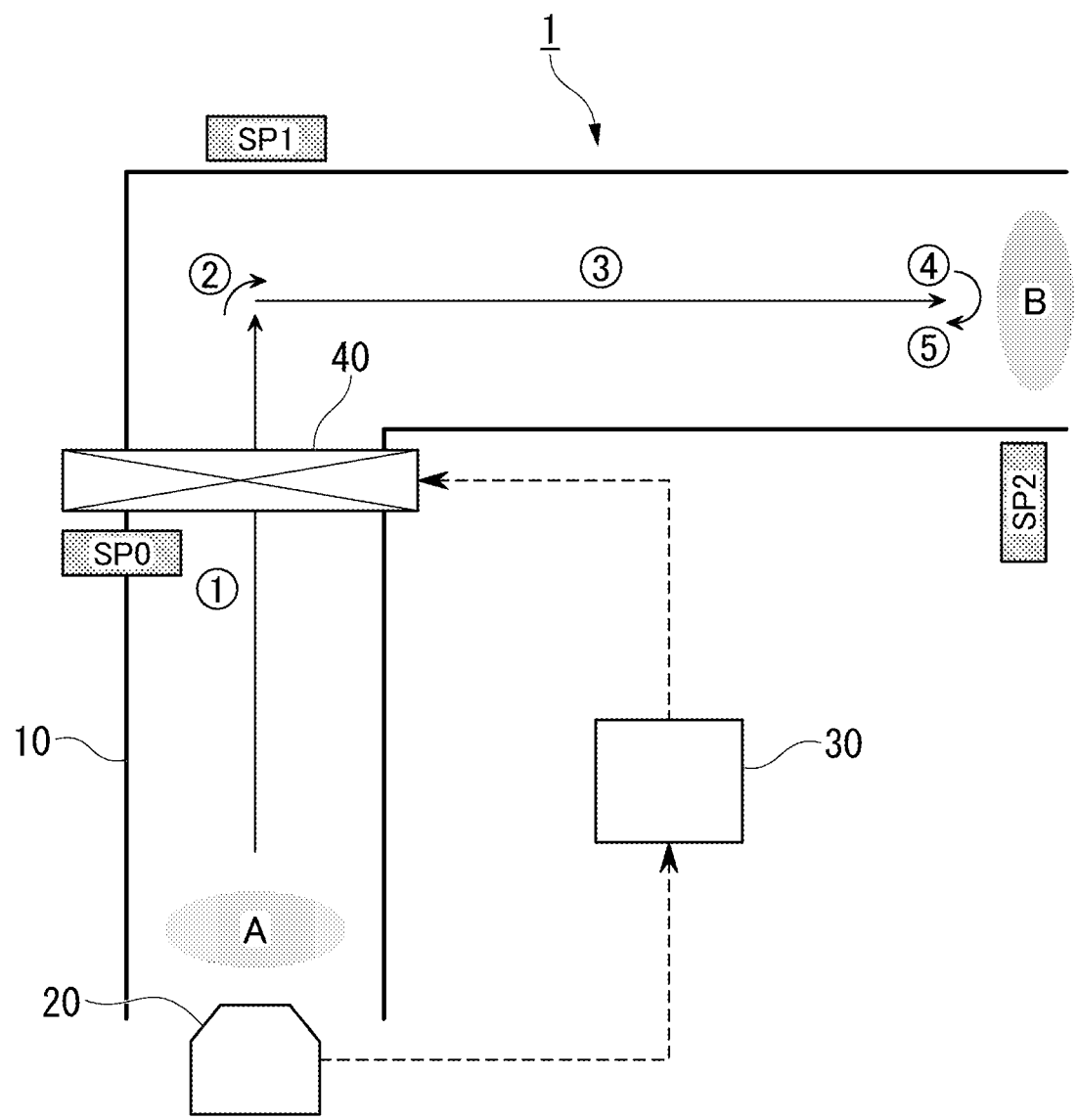
FIG. 1 is a schematic plan view showing an overall configuration of an autonomous mobile robot linkage system in a first embodiment of the present invention.

FIG. 1 is a schematic plan view showing the overall configuration of an autonomous mobile robot linkage system 1 in a first embodiment of the present invention.

As shown in FIG. 1, the autonomous mobile robot linkage system 1 includes a travel path 10 on which a plurality of sign posts SP0 to SP2 (signs) are disposed, an autonomous mobile robot 20 that moves along the travel path 10, a host device 30 for the autonomous mobile robot 20, and a shutter device 40 (a linkage device) provided on the travel path 10.

Here, "sign post" refers to a structure which has a sign that can be read by a camera which is described later, and is placed at a predetermined location on the travel path 10 or near the travel path 10. The sign contains information on an identification number of the structure. The sign includes a detection target portion C in which first cells (C11, C13, . . . ) that are able to reflect light and second cells (C12, C21, . . . ) that are not able to reflect light, which are described later, are disposed on a two-dimensional plane, and includes a one-dimensional code (a barcode) or a two-dimensional code.

Figure 2:
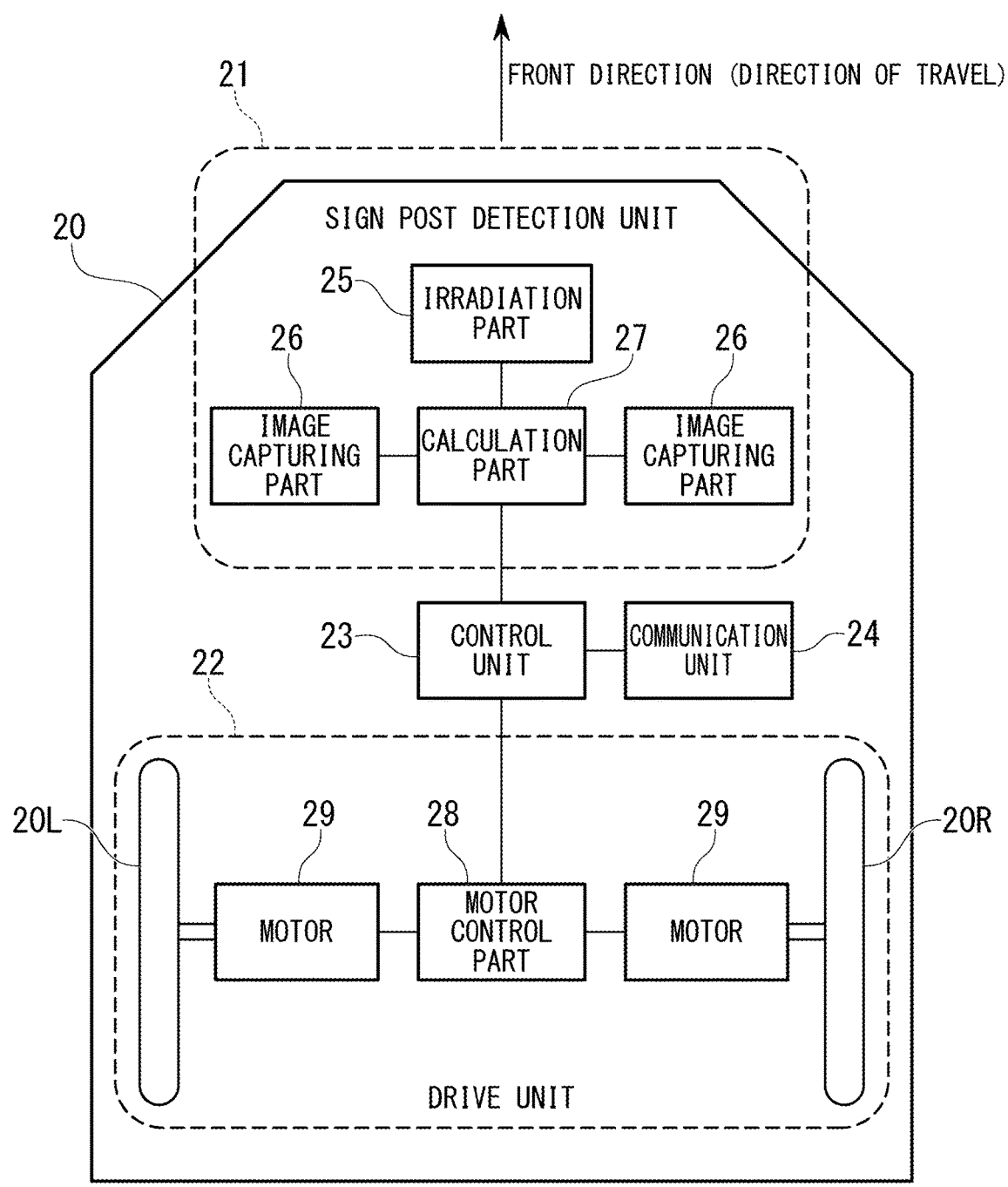
FIG. 2 is a block diagram showing a configuration of an autonomous mobile robot in the first embodiment of the present invention.

FIG. 2 is a block diagram showing a configuration of an autonomous mobile robot 20 in the first embodiment of the present invention.

As shown in FIG. 2, the autonomous mobile robot 20 includes a sign post detection unit 21, a drive unit 22, a control unit 23, and a communication unit 24.

The sign post detection unit 21 has an irradiation part 25, two image capturing parts 26, and a calculation part 27. Further, the drive unit 22 includes a motor control part 28, two motors 29, and left and right drive wheels 20L and 20R. This configuration of the sign post detection unit 21 is an example of one configuration only, and other configurations may be used.

The irradiation part 25 is attached to a central position on a front surface of the autonomous mobile robot 20 in a direction of travel and emits, for example, infrared LED light forward. The infrared LED light is suitable for dark locations such as factories and locations where visible light is strong. The irradiation part 25 may be configured to emit detection light other than the infrared LED light.

The two image capturing parts 26 are disposed on the left and right sides in the sign post detection unit 21. Each of the two image capturing parts 26 uses, for example, a camera combined with an infrared filter, and captures an image of reflected light (the infrared LED light) reflected by the sign post SP.

The calculation part 27 creates a binarized image data consisting of black and white by performing binarization processing based on captured image data transmitted from the two image capturing parts 26. Also, by performing computation based on triangulation using the binarized image data (triangulation using a difference of two captured image data from the two image capturing parts 26), the calculation part 27 calculates a distance (a distance Z) and a direction (an angle θ) where the sign post SP is positioned with respect to the autonomous mobile robot 20.

In a case where a plurality of sign posts SP are included in the captured image data, the calculation part 27 detects identification numbers (identification IDs) of the sign posts SP, selects a target sign post SP, and calculates a distance Z and an angle θ to the target sign post SP.

The drive wheel 20L is provided on a left side of the autonomous mobile robot 20 with respect to the direction of travel. The drive wheel 20R is provided on a right side of the autonomous mobile robot 20 with respect to the direction of travel. The autonomous mobile robot 20 may have a wheel other than the drive wheels 20L and 20R in order to stabilize the posture of the autonomous mobile robot 20.

The motors 29 rotate the left and right drive wheels 20L and 20R according to the control of the motor control part 28.

The motor control part 28 supplies power to the left and right motors 29 based on an angular velocity command value input from the control unit 23. The left and right motors 29 rotate at angular velocities according to the power supplied from the motor control part 28 to move the autonomous mobile robot 20 forward or backward. Further, by creating a difference in the angular velocities of the left and right motors 29, the direction of travel of the autonomous mobile robot 20 is changed.

The control unit 23 controls the drive unit 22 based on information read from the sign post SP by the sign post detection unit 21.

Figure 3:
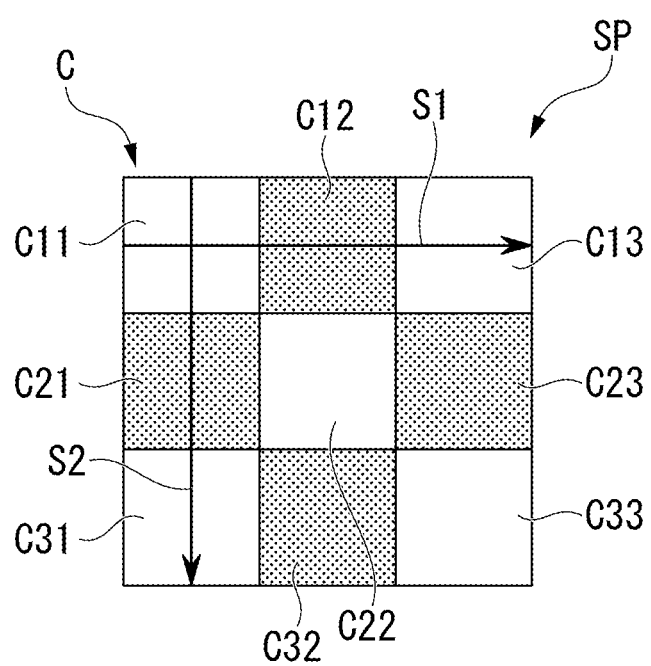
FIG. 3 is a front view of a detection target portion of a sign post read by a sign post detection unit in the first embodiment of the present invention.

FIG. 3 is a front view of the detection target portion C of the sign post SP read by the sign post detection unit 21 in the first embodiment of the present invention.

As shown in FIG. 3, the sign post SP includes the detection target portion C in which the first cells (C11, C13, . . . ) that are able to reflect the infrared LED light and the second cells (C12, C21, . . . ) that are not able to reflect the infrared LED light are disposed on the two-dimensional plane.

The detection target portion C of the present embodiment is formed of a matrix-like pattern of 3 rows by 3 columns. Specifically, the detection target portion C includes a first cell C11 in a first row and a first column, a second cell C12 in a first row and a second column, a first cell C13 in a first row and a third column, a second cell C21 in a second row and a first column, a first cell C22 in a second row and a second column, a second cell C23 in a second row and a third column, a first cell C31 in a third row and a first column, a second cell C32 in a third row and a second column, and a first cell C33 in a third row and a third column.

The first cells C11, C13, C22, C31, and C33 are formed of a material such as aluminum foil or a thin film of titanium oxide which has a high reflectance of infrared LED light. The second cells C12, C21, C23, and C32 are formed of a material such as an infrared cut film, a polarizing film, an infrared absorbing material, or black felt and the like which have a low reflectance of infrared LED light.

The calculation part 27 detects the sign post SP by performing a first scan S1 and a second scan S2 on the detection target portion C. In the first scan S1, for example, the first cell C11, the second cell C12, and the first cell C13 disposed in "white, black, and white" in the first row are detected. In the second scan S2, for example, the first cell C11, the second cell C21, and the first cell C31 disposed in "white, black, and white" in the first column are detected.

When the cell is expressed in a binary code, where white is "1" and black is "0 (zero)," "white, black, and white" can be expressed as "1, 0, and 1.", and the calculation part 27 detects the sign post SP when the reading of "1, 0, and 1" in the first scan S1 and "1, 0, and 1" in the second scan S2 is successful.

The calculation part 27 reads the identification number (the identification ID) of the sign post SP from the remaining cells (the first cell C22 in the second row and the second column, the second cell C23 in the second row and the third column, the second cell C32 in the third row and the second column, and the first cell C33 of the third row and third column) of the detection target portion C. In the example shown in FIG. 3, 4-bit information can cause the calculation part 27 to read the identification number of the sign post SP.

Figure 4:
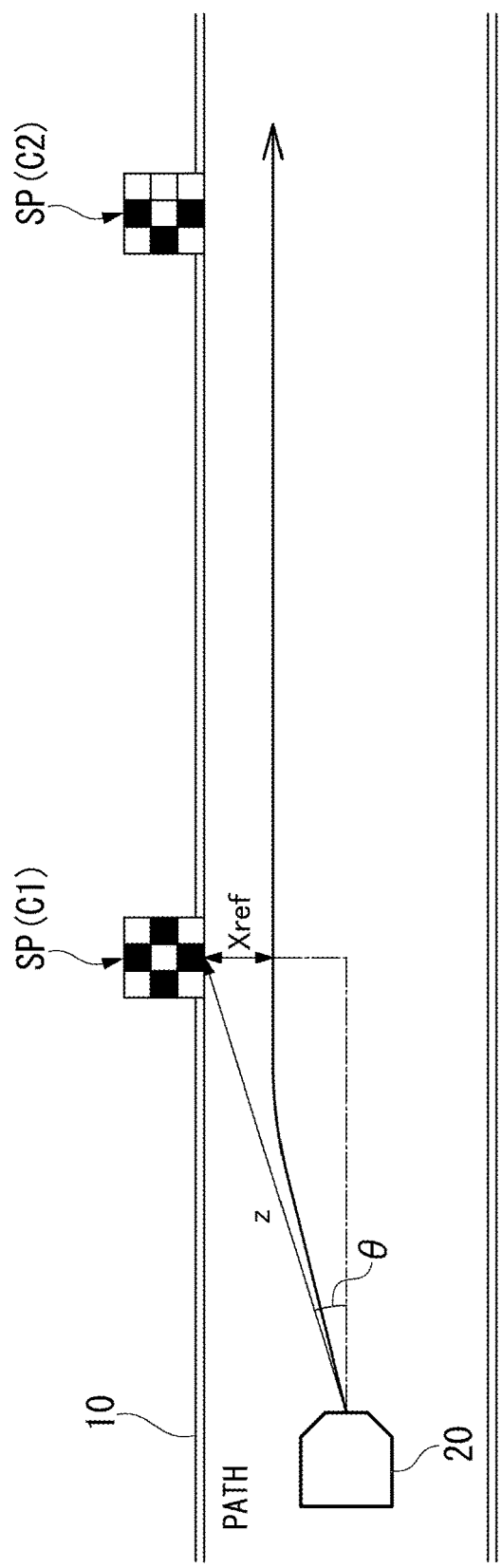
FIG. 4 is a view showing a travel example of the autonomous mobile robot in the first embodiment of the present invention.

FIG. 4 is a view showing a travel example of the autonomous mobile robot 20 in the first embodiment of the present invention. In the travel example shown in FIG. 4, the autonomous mobile robot 20 moves while maintaining a constant distance from a left side of the travel path 10. In order to maintain the constant distance Xref from the left side of the travel path 10, the autonomous mobile robot 20 acquires the distance Z and the direction θ to the detected sign post SP and calculates a direction of travel that satisfies a condition in which the distance Z and the direction θ are predetermined.

The direction θ is an angle formed by the direction of travel of the autonomous mobile robot 20 and a direction of the detected sign post SP. The direction of travel that satisfies the predetermined condition is a direction of travel in which the direction θ is arcsin (Xref/Z). When the distance Z to the sign post SP including a detection target portion C1 is less than a predetermined threshold value, the autonomous mobile robot 20 switches the target to the next sign post SP including a detection target portion C2 to move.

Figure 5:
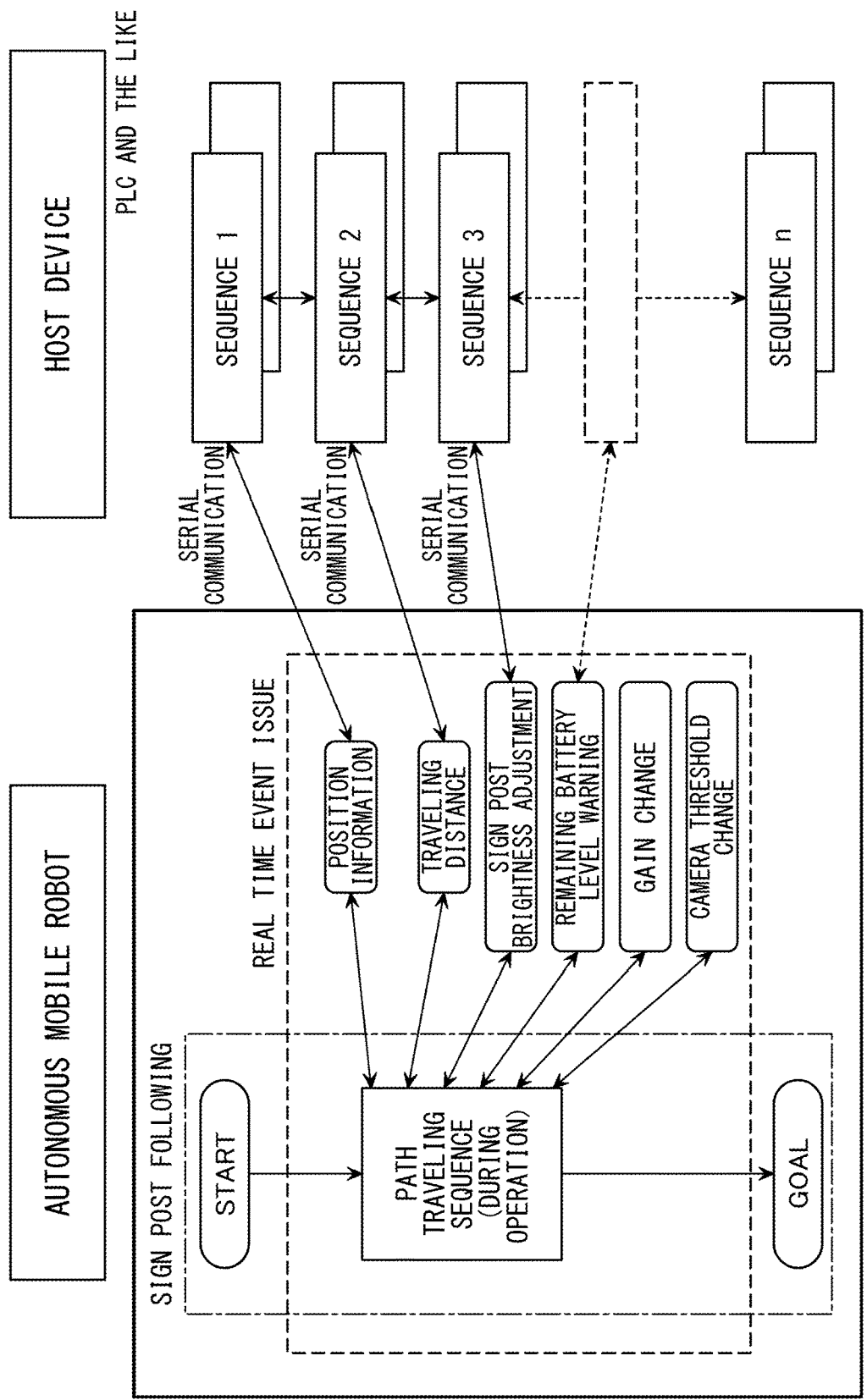
FIG. 5 is a block diagram showing the content of linkage between the autonomous mobile robot and a host device in the first embodiment of the present invention.

FIG. 5 is a block diagram showing the content of linkage between the autonomous mobile robot 20 and the host device 30 in the first embodiment of the present invention. FIG. 6 is a diagram showing an operation table of the autonomous mobile robot 20 in the first embodiment of the present invention.

First, the operation table of the autonomous mobile robot 20 is described. As shown in FIG. 6, the operation table stores an STEP input sequence in which the autonomous mobile robot 20 performs predetermined operations in order of pre-set operation numbers. A user can edit the operation table using GUI software shown in FIG. 6 (for example, by selecting each parameter from a pull-down menu). The operation table is stored in each of the autonomous mobile robot 20 and the host device 30.

A string of digits on the left edge of the page shown in FIG. 6 is the operation numbers. Each operation number is associated with each item of "operations," "parameters," and "event issue." The "parameters" include "sign post size/operation," "sign post No./rotation angle," "following direction," "sign post left-right distance." and "sign post front-rear distance." The contents of the parameters are described later together with the operation of the autonomous mobile robot 20.

The control unit 23 (see FIG. 2) executes operations in order of the operation numbers shown in FIG. 6 based on the identification numbers of the sign posts SP read by the calculation part 27.

The communication unit 24 communicates the operation number being executed by the control unit 23 to the host device 30 in real time. The communication unit 24 of the present embodiment performs serial communication with the host device 30 as shown in FIG. 5.

The host device 30 is constituted by, for example, a programmable logic controller (PLC) and the like, receives information on the operation number being executed from the autonomous mobile robot 20, and generates an event on the travel path 10 based on the operation number. The host device 30 of the present embodiment grasps position information on the autonomous mobile robot 20 from the operation number being executed in the autonomous mobile robot 20 and generates an event for opening or closing the shutter device 40 shown in FIG. 1, for example.

The host device 30 may generate events (sequences 1 to n) based on not only the position information on the autonomous mobile robot 20, but also a traveling distance of the autonomous mobile robot 20, brightness of the sign post SP, remaining battery level warning of the autonomous mobile robot 20, a gain change of the autonomous mobile robot 20, a camera threshold change of the autonomous mobile robot 20, and the like.

Next, an operation example of the autonomous mobile robot linkage system 1 based on the operation table shown in FIG. 6 in a situation shown in FIG. 1 (a situation where the autonomous mobile robot 20 moves from a start point A to a goal point B) is described.

Figure 7:
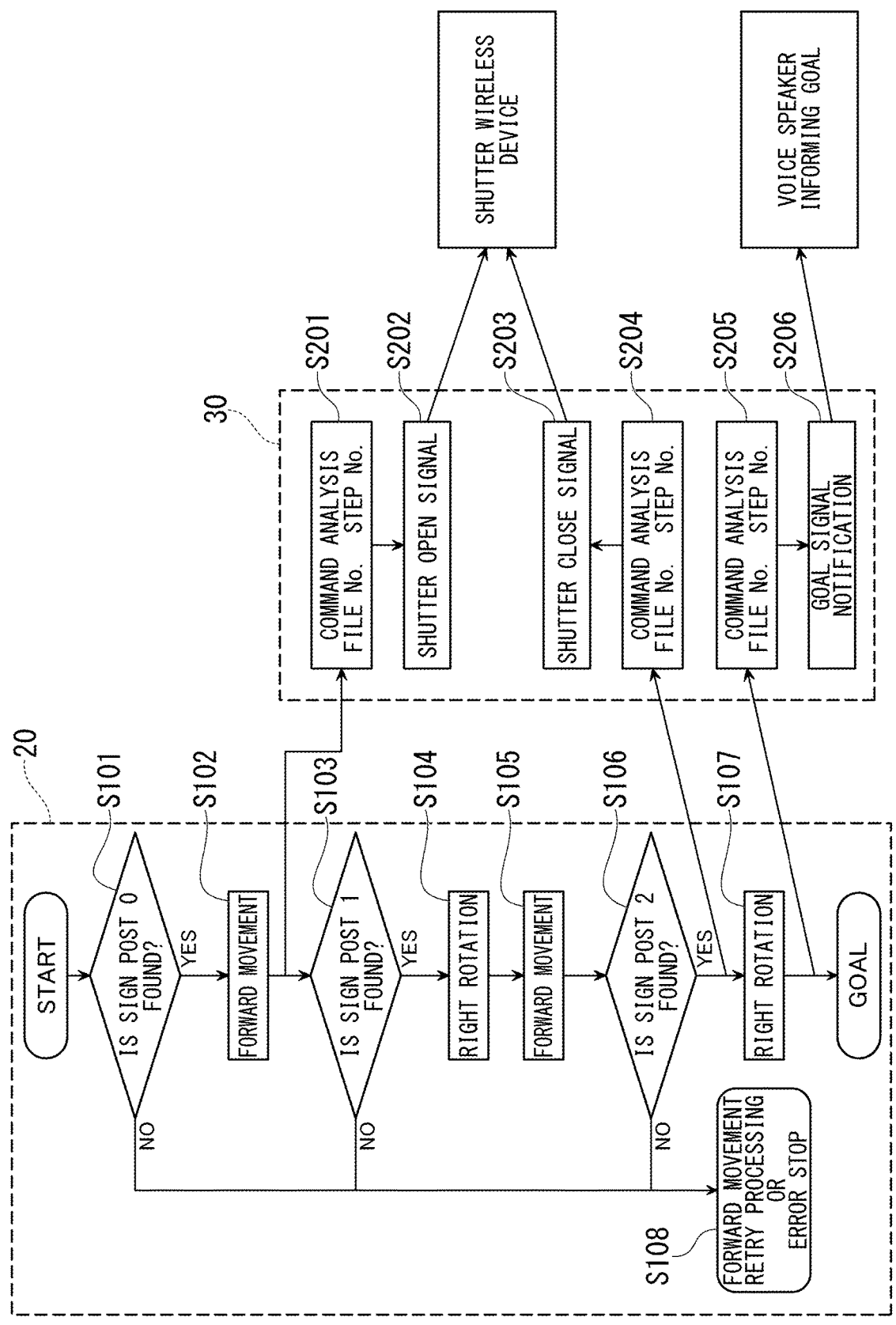
FIG. 7 is a flowchart showing an operation example of the autonomous mobile robot linkage system based on the operation table shown in FIG. 6.
Figure 8:
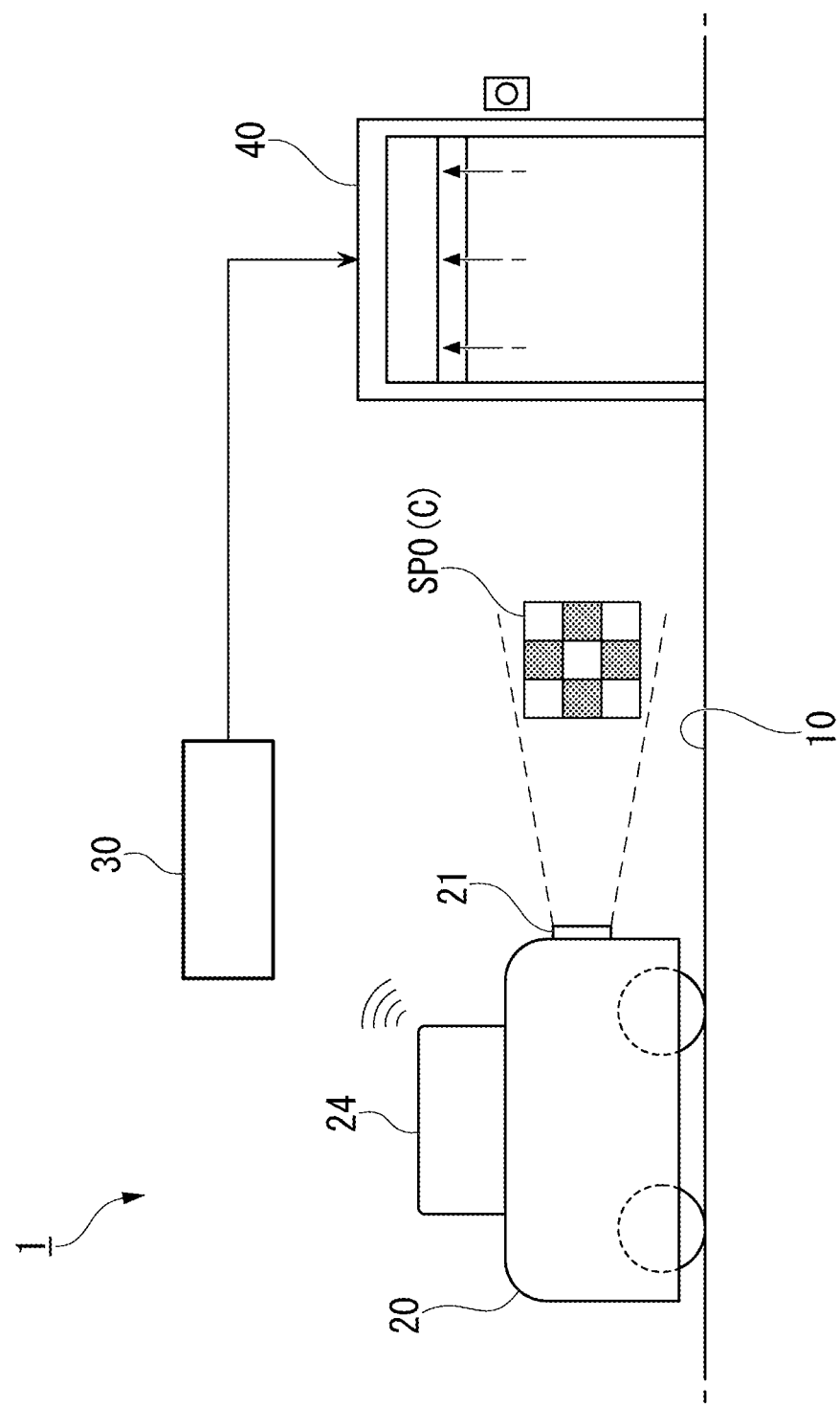
FIG. 8 is an explanatory view showing one scene of the operation example shown in FIG. 7.

FIG. 7 is a flowchart showing the operation example of the autonomous mobile robot linkage system 1 based on the operation table shown in FIG. 6. FIG. 8 is an explanatory view showing one scene of the operation example shown in FIG. 7.

The autonomous mobile robot 20 positioned at the start point A shown in FIG. 1 moves forward upon receipt of a "forward movement" event issued by the host device 30 based on the operation table shown in FIG. 6. The communication unit 24 serially communicates this operation number "0" to the host device 30.

Next, the autonomous mobile robot 20 performs a predetermined operation set to the next operation number "1." The "operation" set to the operation number "1" is detection of the "sign post." The "sign post" detected here has a "sign post size" of "M," a "sign post No." of "0." a "following direction" of the "front," a "sign post left-right distance" of "0," and a "sign post front-rear distance" of "2."

Specifically, a detection target of the autonomous mobile robot 20 is the sign post SP0 having a sign post size of M (medium) (other sizes such as S (small), and L (large) can be set). Further, the following direction of the autonomous mobile robot 20 with respect to the sign post SP0 (the direction of travel that satisfies the above-described predetermined condition) is the front (a forward direction), and the sign post left-right distance is 0 (0 with respect to the above-described Xref (see FIG. 4)), and the sign post front-rear distance is 2 meters (the above-described Z (see FIG. 4) which is a switching distance of the sign post).

In a case where the sign post SP0 is found (YES in step S101), the communication unit 24 serially communicates this operation number "1" to the host device 30. When the host device 30 receives the operation number "1," the host device 30 executes command analysis based on the operation number (step S201). As shown in FIG. 8, the host device generates an event for opening the shutter device 40 based on the operation number "1" (step S202).

The shutter device 40 includes a communication device (such as a wireless device) (not shown) that communicates with the host device 30 and an actuator (not shown) that opens and closes the shutter. The shutter device 40 receives a command from the host device 30 and opens the shutter.

Further, in a case where the sign post SP0 is found (YES in step S101), next, the autonomous mobile robot 20 performs a predetermined operation set to an operation number "2." The "operation" set to the operation number "2" is "forward movement" (step S102). The parameter of the "operation" for this forward movement is "2." That is, the autonomous mobile robot 20 moves forward by 2 meters and passes through the shutter device 40. The communication unit 24 serially communicates this operation number "2" to the host device 30.

On the other hand, in a case where the sign post SP0 could not be found (NO in step S101 (similarly NO in step S103 and NO in step S106, which is described later)), the autonomous mobile robot 20 performs retry processing of the forward movement or outputs an error message to stop (step S108).

After the operation number "2," the autonomous mobile robot 20 performs a predetermined operation set to an operation number "3." The "operation" set to the operation number "3" is detection of the "sign post." The "sign post" detected here has a "sign post size" of "M," a "sign post No." of "1," a "following direction" of the "front," a "sign post left-right distance" of "0," and a "sign post front-rear distance" of "2." In a case where the sign post SP1 is found (YES in step S103), the communication unit 24 serially communicates this operation number "3" to the host device 30.

Next, the autonomous mobile robot 20 performs a predetermined operation set to an operation number "4." The "operation" set to the operation number "4" is "rotation." The parameter of the "operation" for this rotation is "right rotation," and the parameter of the "rotation angle" is "90" degrees. That is, as shown in FIG. 1, the autonomous mobile robot 20 rotates right by 90 degrees in front of the sign post SP1 (step S104). The autonomous mobile robot 20 moves forward after rotating right by 90 degrees (step S105).

Next, the autonomous mobile robot 20 performs a predetermined operation set to an operation number "5." The "operation" set to the operation number "5" is detection of the "sign post." The "sign post" detected here has a "sign post size" of "M," a "sign post No." of "2," a "following direction" of the "front," a "sign post left-right distance" of "0," and a "sign post front-rear distance" of "2." In a case where the sign post SP2 is found (YES in step S106), the communication unit 24 serially communicates this operation number "5" to the host device 30.

When the host device 30 receives the operation number "5," the host device 30 executes command analysis based on the operation number (step S204). The host device generates an event for closing the shutter device 40 based on the operation number "5" (step S203). The shutter device 40 receives a command from the host device 30 and closes the shutter.

Further, in a case where the sign post SP2 is found (YES in step S106), the autonomous mobile robot 20 performs a predetermined operation set to an operation number "6." The "operation" set to the operation number "6" is "rotation." The parameter of the "operation" for this rotation is "right rotation," and the parameter of the "rotation angle" is "180" degrees. That is, as shown in FIG. 1, the autonomous mobile robot 20 rotates right by 180 degrees (reverses) at the goal point B (step S107). The communication unit 24 serially communicates this operation number "6" to the host device 30.

A predetermined operation set to the next operation number "7" is "goal." The communication unit 24 serially communicates this operation number "7" to the host device 30. When the host device 30 receives the operation number "7," the host device 30 executes command analysis based on the operation number (step S205). The host device generates an event for informing a voice speaker (not shown) of the goal of the autonomous mobile robot 20 based on the operation number "7" (step S206). For example, the voice speaker receives a command from the host device 30 and performs a goal notification.

In this way, a series of operations of the autonomous mobile robot linkage system 1 in the situation shown in FIG. 1 are completed.

Figure 9:
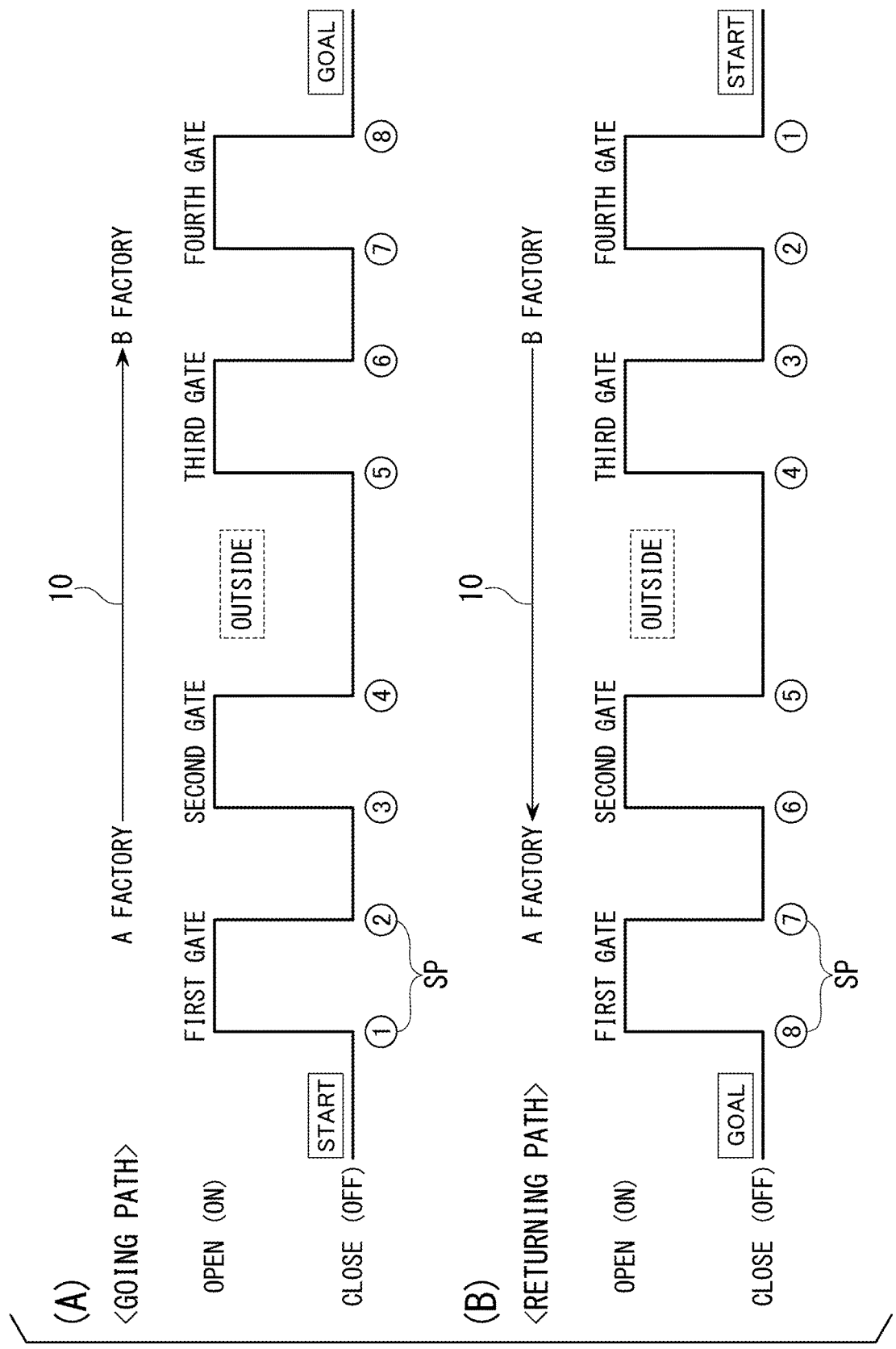
FIG. 9 is a schematic diagram showing an example of the autonomous mobile robot linkage system in the first embodiment of the present invention.

FIG. 9 is a schematic diagram showing an example of the autonomous mobile robot linkage system 1 in the first embodiment of the present invention. FIG. 10 is an example of serial communication performed in the autonomous mobile robot linkage system 1 shown in FIG. 9.

In the example shown in FIG. 9, the autonomous mobile robot 20 moves from an A factory to a B factory along the travel path 10. The travel path 10 has first to fourth gates (shutter devices), and the autonomous mobile robot 20 moves to the factory B after going outside of the A factory once.

The sign posts SP are disposed in front of and behind each gate, and as described above, the host device 30 receives the information on the operation number being executed from the autonomous mobile robot 20 and generates an event for opening or closing each gate on the travel path 10 based on the operation number. As shown in FIG. 10, the operation number received by the host device 30 is accompanied by an index number (INDEX No.) relating to a going path and a returning path of the travel path 10 at a beginning portion thereof.

That is, the host device 30 receives the index number and the operation number through the serial communication. For example, in a case where the index number is "0," it is the going path, and in a case where the index number is "1," it is the returning path. The host device 30 determines from the index number whether the autonomous mobile robot 20 is on the going path or the returning path. If the autonomous mobile robot 20 is on the returning path, the host device 30 causes the shutter device 40 to be opened or closed from a side of the fourth gate. As a result, even in a case where the same sign post SP is detected, different events can be generated in the going path and the returning path.

In this way, according to the above-described autonomous mobile robot linkage system 1, the autonomous mobile robot 20 moves along the travel path 10 while reading the plurality of sign posts SP in order using the camera and performs the predetermined operations in order of the pre-set operation numbers based on the identification numbers read from the sign posts SP. The operation table of the autonomous mobile robot 20 following the sign posts SP is set in a STEP type setting method, as shown in FIG. 6.

According to this STEP type setting method, the actual installation location of the sign post SP and the operation number of the operation table match each other as the position information. That is, since the host device 30 is notified of the operation number being executed in the autonomous mobile robot 20, it is possible to issue an event and perform another sequence control even when the autonomous mobile robot 20 is in a main transportation operation.

Therefore, according to this autonomous mobile robot linkage system 1, when the user links the position information of the autonomous mobile robot 20 to a place where the sign post SP is installed, one or more events required at an arbitrary timing can be easily generated at the same time using the host device 30. Moreover, at this time, there is no need to change a layout of the sign post SP or stop the movement of the autonomous mobile robot 20, and it is possible to simultaneously control the operation of the autonomous mobile robot 20 and the event.

In addition, according to the autonomous mobile robot linkage system 1, since the setting is completed by editing the operation table shown in FIG. 6 with an input from a PC or the like, there is no need to apply an additional tape or the like for each event unlike a tape type AGV. Further, if the operation table shown in FIG. 6 is edited, it is possible to easily change the location where the event is generated without changing the place where the sign post SP is installed. Due to such a STEP input sequence, there is no need for advanced knowledge and complicated effort to change the area setting unlike the SLAM method of the related art. In addition, since the position of an error generation place or the like is set by the STEP input setting method, it is easier to take up means of following the operation orderly and chronologically.

In this way, according to the above-described present embodiment, a configuration including the plurality of sign posts SP disposed along the travel path 10, the autonomous mobile robot 20 which moves along the travel path 10 while reading the plurality of sign posts SP in order using a camera and performs predetermined operations in order of pre-set operation numbers based on identification numbers read from the sign posts SP, and the host device 30 which receives information on the operation number being executed from the autonomous mobile robot 20 and generates an event on the travel path based on the operation number is adopted. Therefore, it is possible to generate the event on the travel path 10 at an arbitrary timing without requiring advanced knowledge or complicated effort by simply disposing sign posts SP along the travel path 10.

Moreover, according to the present embodiment, as shown in FIG. 1, the shutter device 40 is provided on the travel path 10, and the host device 30 generates an event for opening or closing the shutter device 40 on the basis of the operation number being executed in the autonomous mobile robot 20. According to this configuration, the movement of the autonomous mobile robot 20 is able to be prevented from being delayed by the shutter device 40, and the tact time of the work of the autonomous mobile robot 20 can be improved.

Further, according to the present embodiment, as shown in FIGS. 1, 6 and 7, the host device 30 generates an event for opening or closing the shutter device 40 on the travel path 10 before the autonomous mobile robot 20 reaches the read sign post SP0. According to this configuration, the shutter device 40 is able to be opened in advance, and the autonomous mobile robot 20 is able to pass through the shutter device 40 without temporarily stopping in front of the shutter device 40.

On the other hand, in the case of the tape type AGV of the related art, if an ID tag or an auxiliary tape that causes an event to be generated is attached to the location of the sign post SP0 shown in FIG. 1, the event is issued after the autonomous mobile robot 20 reaches the location where the ID tag or the auxiliary tape is pasted. Therefore, the shutter device 40 cannot be opened in advance, and the autonomous mobile robot 20 needs to be temporarily stopped in front of the shutter device 40.

Further, according to the present embodiment, as shown in FIG. 10, the operation number is accompanied by the index number relating to the going path and the returning path of the travel path 10. As a result, as shown in FIG. 9, even in a case where the same sign post SP is detected, different events are able to be generated in the going path and the returning path.

Further, according to the present embodiment, as shown in FIG. 3, the sign post SP includes the detection target portion C in which the first cells (C11, C13, . . . ) that are able to reflect light and second cells (C12, C21, . . . ) that are not able to reflect light are disposed on the two-dimensional plane, and as shown in FIG. 2, the autonomous mobile robot 20 includes the image capturing part 26 that captures an image of the reflected light of the detection target portion C using a camera, the calculation part 27 that reads the identification numbers of the sign posts SP based on the image data captured by the image capturing part 26, the control unit 23 that executes operations in order of the operation numbers based on the identification numbers, and the communication unit 24 that communicates the operation number being executed by the control unit 23 to the host device 30. According to this configuration, it is possible to detect the sign post SP at low cost and with high accuracy, and it is possible to communicate the operation number being executed by the control unit 23 to the host device 30.

Second Embodiment

Next, a second embodiment of the present invention is described. In the following description, the same or equivalent configurations as those in the above-described embodiment are designated by the same reference signs, and the description thereof are simplified or omitted.

Figure 11:
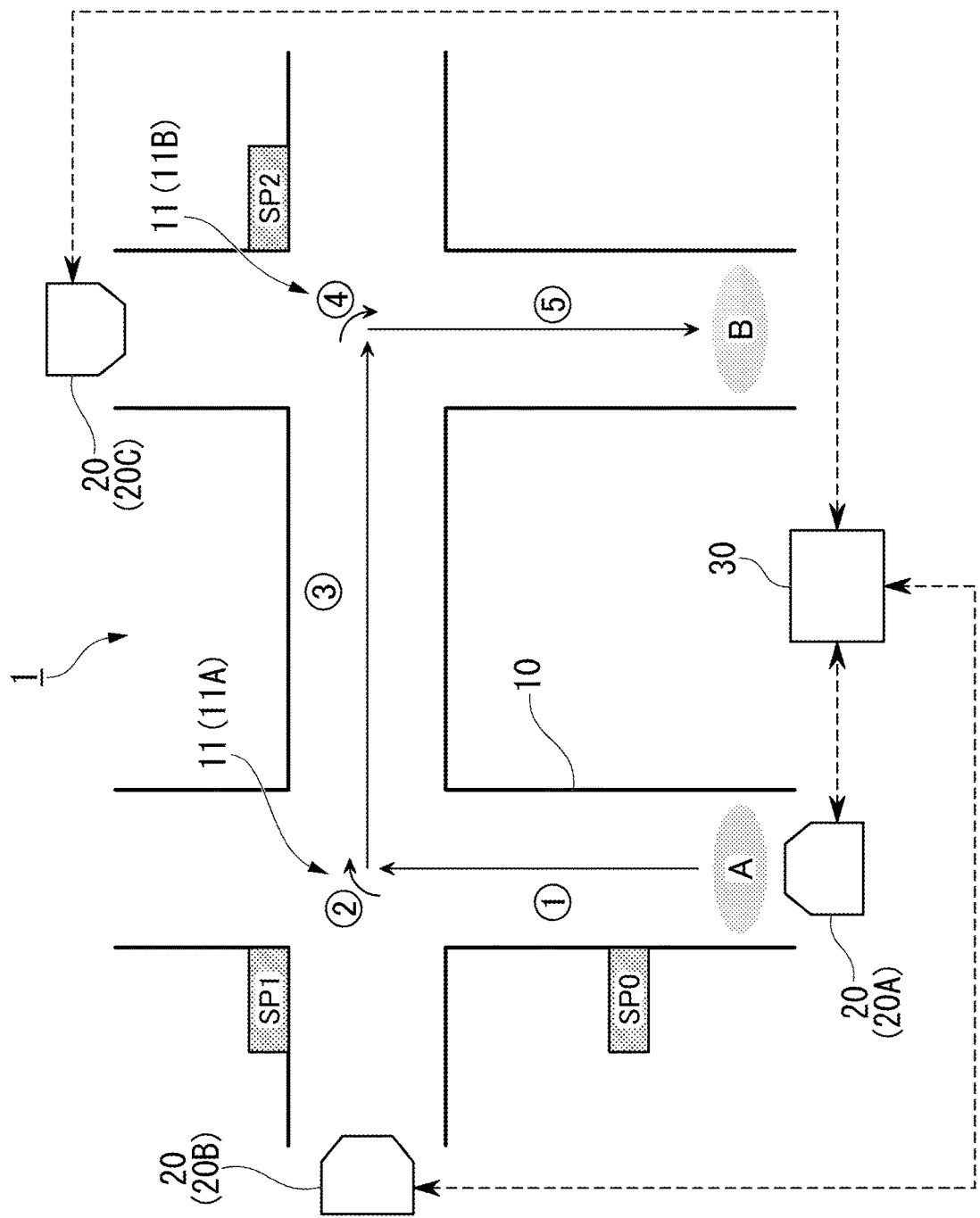
FIG. 11 is a schematic plan view showing the overall configuration of an autonomous mobile robot linkage system in the second embodiment of the present invention.

FIG. 11 is a schematic plan view showing the overall configuration of an autonomous mobile robot linkage system 1 in a second embodiment of the present invention.

As shown in FIG. 11, in the second embodiment, a plurality of autonomous mobile robots 20 are moving along a travel path 10. In addition, a plurality of intersections 11 are provided on the travel path 10.

A host device 30 of the second embodiment generates an intersection control event and controls the autonomous mobile robots 20 not to collide with each other at the intersections 11. Specifically, the host device 30 generates an event for temporarily stopping other autonomous mobile robots 20A and 20B (second autonomous mobile robots) from position information based on an operation number of the autonomous mobile robot 20 such that the other autonomous mobile robots 20A and 20B do not enter the same intersection 11 together with the autonomous mobile robot 20.

Figure 13:
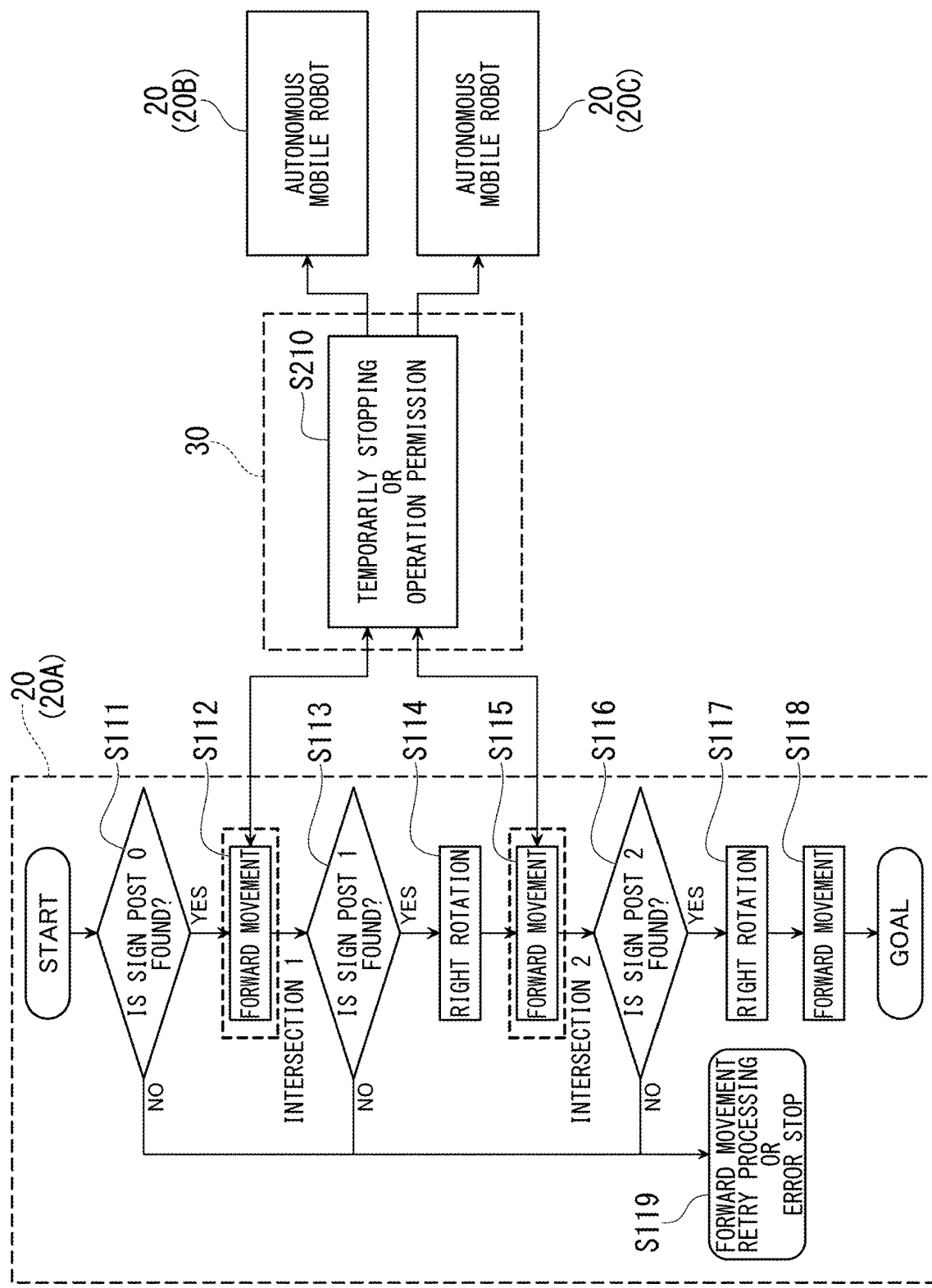
FIG. 13 is a flowchart showing an operation example of the autonomous mobile robot linkage system based on the operation table shown in FIG. 12.

FIG. 12 is a diagram showing an operation table of the autonomous mobile robot in the second embodiment of the present invention. FIG. 13 is a flowchart showing an operation example of the autonomous mobile robot linkage system 1 based on the operation table shown in FIG. 12.

First, the autonomous mobile robot 20 positioned at a start point A shown in FIG. 11 moves forward upon receipt of a "forward movement" event issued by the host device based on the operation table shown in FIG. 12. A communication unit 24 serially communicates this operation number "0" to the host device 30.

Next, the autonomous mobile robot 20 performs a predetermined operation set to the next operation number "1." The "operation" set to the operation number "1" is detection of the "sign post." The "sign post" detected here has a "sign post size" of "M," a "sign post No." of "0," a "following direction" of the "front." a "sign post left-right distance" of "0," and a "sign post front-rear distance" of "2."

Specifically, a detection target of the autonomous mobile robot 20 is the sign post SP0 having a sign post size of M (other sizes such as S and L can be set). Further, the following direction of the autonomous mobile robot 20 with respect to the sign post SP0 (the direction of travel that satisfies the above-described predetermined condition) is the front (a forward direction), and the sign post left-right distance is 0 (0 with respect to the above-described Xref (see FIG. 4)), and the sign post front-rear distance is 2 meters (the above-described Z (see FIG. 4) which is a switching distance of the sign post).

In a case where the sign post SP0 is found (YES in step S111), the communication unit 24 serially communicates this operation number "1" to the host device 30. Next, the autonomous mobile robot 20 performs a predetermined operation set to an operation number "2." The "operation" set to the operation number "2" is "forward movement" (step S112). The parameter of the "operation" for this forward movement is "2." That is, the autonomous mobile robot 20 moves forward by 2 meters and enters a first intersection 11A. The communication unit 24 serially communicates this operation number "2" to the host device 30.

On the other hand, in a case where the sign post SP0 could not be found (NO in step S111 (similarly NO in step S113 and NO in step S116, which is described later)), the autonomous mobile robot 20 performs retry processing of the forward movement or outputs an error message to stop (step S119).

When the host device 30 receives the operation number "2." the host device 30 executes command analysis based on the operation number. Then, the host device 30 generates an event (intersection control 1) for temporarily stopping the autonomous mobile robot 20A that is about to enter the intersection 11A at the same timing as the autonomous mobile robot 20 based on the operation number "2" (step S210). The autonomous mobile robot 20A receives a command from the host device 30 and is temporarily stopped in front of the intersection 11A.

Next the operation number "2," the autonomous mobile robot 20 performs a predetermined operation set to an operation number "3." The "operation" set to the operation number "3" is detection of the "sign post." The "sign post" detected here has a "sign post size" of "M," a "sign post No." of "1," a "following direction" of the "front," a "sign post left-right distance" of "0." and a "sign post front-rear distance" of "2." In a case where the sign post SP1 is found (YES in step S113), the communication unit 24 serially communicates this operation number "3" to the host device 30.

Next, the autonomous mobile robot 20 performs a predetermined operation set to an operation number "4." The "operation" set to the operation number "4" is "rotation." The parameter of the "operation" for this rotation is "right rotation," and the parameter of the "rotation angle" is "90" degrees. That is, as shown in FIG. 11, the autonomous mobile robot 20 rotates right by 90 degrees at the intersection 11A (step S114). The communication unit 24 serially communicates this operation number "4" to the host device 30.

Next, the autonomous mobile robot 20 performs a predetermined operation set to an operation number "5." The "operation" set to the operation number "5" is "forward movement" (step S115). The parameter of the "operation" for this forward movement is "2." That is, the autonomous mobile robot 20 moves forward by 2 meters and enters a second intersection 11B. The communication unit 24 serially communicates this operation number "5" to the host device 30.

When the host device 30 receives the operation number "5," first, the host device detects that the autonomous mobile robot 20 has passed through the intersection 11A based on the operation number "5" and generates an operation permission event to the autonomous mobile robot 20A that is temporarily stopped in front of the intersection 11A. As a result, the autonomous mobile robot 20A is able to enter the intersection 11A.

Further, when the host device 30 receives the operation number "5." the host device 30 executes command analysis based on the operation number. The host device generates an event (intersection control 2) for temporarily stopping the autonomous mobile robot 20B that is about to enter the second intersection 11B at the same timing as the autonomous mobile robot 20 based on the operation number "5" (step S210). The autonomous mobile robot 20B receives a command from the host device 30 and is temporarily stopped in front of the intersection 11B.

Next, the autonomous mobile robot 20 performs a predetermined operation set to an operation number "6." The "operation" set to the operation number "6" is detection of the "sign post." The "sign post" detected here has a "sign post size" of "M," a "sign post No." of "2," a "following direction" of the "front," a "sign post left-right distance" of "0," and a "sign post front-rear distance" of "2." In a case where the sign post SP2 is found (YES in step S116), the communication unit 24 serially communicates this operation number "6" to the host device 30.

Next, the autonomous mobile robot 20 performs a predetermined operation set to an operation number "7." The "operation" set to the operation number "7" is "rotation." The parameter of the "operation" for this rotation is "right rotation," and the parameter of the "rotation angle" is "90" degrees. That is, as shown in FIG. 11, the autonomous mobile robot 20 rotates right by 90 degrees at the intersection 11B (step S117). The communication unit 24 serially communicates this operation number "7" to the host device 30.

Next, the autonomous mobile robot 20 performs a predetermined operation set to an operation number "8." The "operation" set to the operation number "8" is "forward movement" (step S118). The parameter of the "operation" for this forward movement is "2." That is, the autonomous mobile robot 20 moves forward by 2 meters and moves to the goal point B. The communication unit 24 serially communicates this operation number "8" to the host device 30.

When the host device 30 receives the operation number "8." the host device 30 detects that the autonomous mobile robot 20 has passed through the intersection 11B based on the operation number "8" and generates an operation permission event to the autonomous mobile robot 20B that is temporarily stopped in front of the intersection 11B. As a result, the autonomous mobile robot 20B is able to enter the intersection 11B.

A predetermined operation set to the next operation number "9" is "goal." The communication unit 24 serially communicates this operation number "9" to the host device 30. When the host device 30 receives the operation number "9," the host device 30 generates an event for informing a voice speaker (not shown) of the goal of the autonomous mobile robot 20 as in the first embodiment described above.

In this way, a series of operations of the autonomous mobile robot linkage system 1 in the situation shown in FIG. 11 are completed.

In this way, according to the second embodiment described above, the travel path is provided with the intersections 11A and 11B, the other autonomous mobile robots 20A and 20B (the second autonomous mobile robots) moving on the travel path 10 are provided as linkage devices linked to the autonomous mobile robot 20, and the host device generates an event for temporarily stopping entry of the other autonomous mobile robots 20A and 20B into the same intersection 11 together with the autonomous mobile robot 20 based on the operation number of the autonomous mobile robot 20. According to this configuration, in a case where a plurality of autonomous mobile robots 20 are moving on the travel path 10 having the intersection 11, collision between the autonomous mobile robots 20 at the intersection 11 is able to be prevented.

In a case where two autonomous mobile robots 20 are about to enter the same intersection 11, priority to proceed may be with the autonomous mobile robot 20 that communicates with the host device 30 first, while the other autonomous mobile robot 20 may wait. Moreover, even in a case where three or more autonomous mobile robots 20 are about to enter the intersection 11, the first of the autonomous mobile robots 20 to communicate with the host device 30 may be given precedence so that the autonomous mobile robot 20 may proceed.

Third Embodiment

Next, a third embodiment of the present invention is described. In the following description, the same or equivalent configurations as those in the above-described embodiment are designated by the same reference signs, and the description thereof are simplified or omitted.

Figure 14:
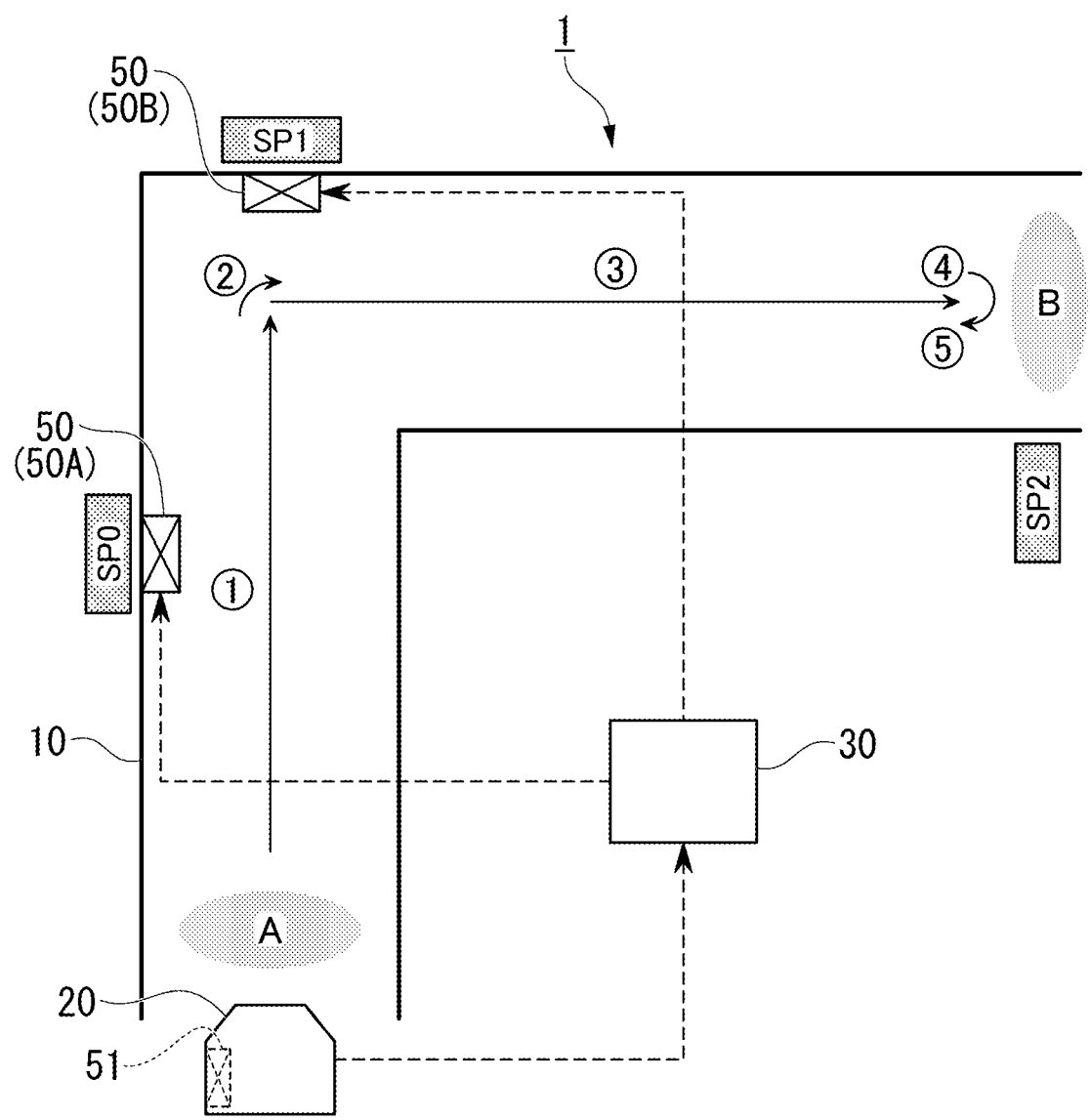
FIG. 14 is a schematic plan view showing the overall configuration of an autonomous mobile robot linkage system in the third embodiment of the present invention.

FIG. 14 is a schematic plan view showing the overall configuration of an autonomous mobile robot linkage system 1 in the third embodiment of the present invention.

As shown in FIG. 14, in the third embodiment, a power transmitting device 50 is provided on a travel path 10, and a power receiving device 51 is provided in an autonomous mobile robot 20. The power transmitting device 50 supplies power to the power receiving device 51 without direct contact.

The autonomous mobile robot 20 uses, for example, magnetic coupling or magnetic resonance between a primary coil provided in the power transmitting device 50 and a secondary coil provided in the power receiving device 51 to transmit high-frequency power from the power transmitting device 50 in a contactless manner. The power receiving device 51 is provided with a power conversion circuit that converts the power received from the power transmitting device 50 by contactless power supply into DC power and supplies the DC power to a battery (a secondary battery, a large-capacity electric double layer capacitor, or the like that is able to store sufficient power as a driving power source) of the autonomous mobile robot 20.

When the autonomous mobile robot 20 (the power receiving device 51) moves to a position facing the power transmitting device 50, a host device 30 of the third embodiment generates a wireless charging control event for automatically starting power supply. Specifically, the host device 30 detects the position of the autonomous mobile robot 20 based on the operation number of the autonomous mobile robot 20 and generates an event for starting or stopping power supply from the power transmitting device 50.

Figure 16:
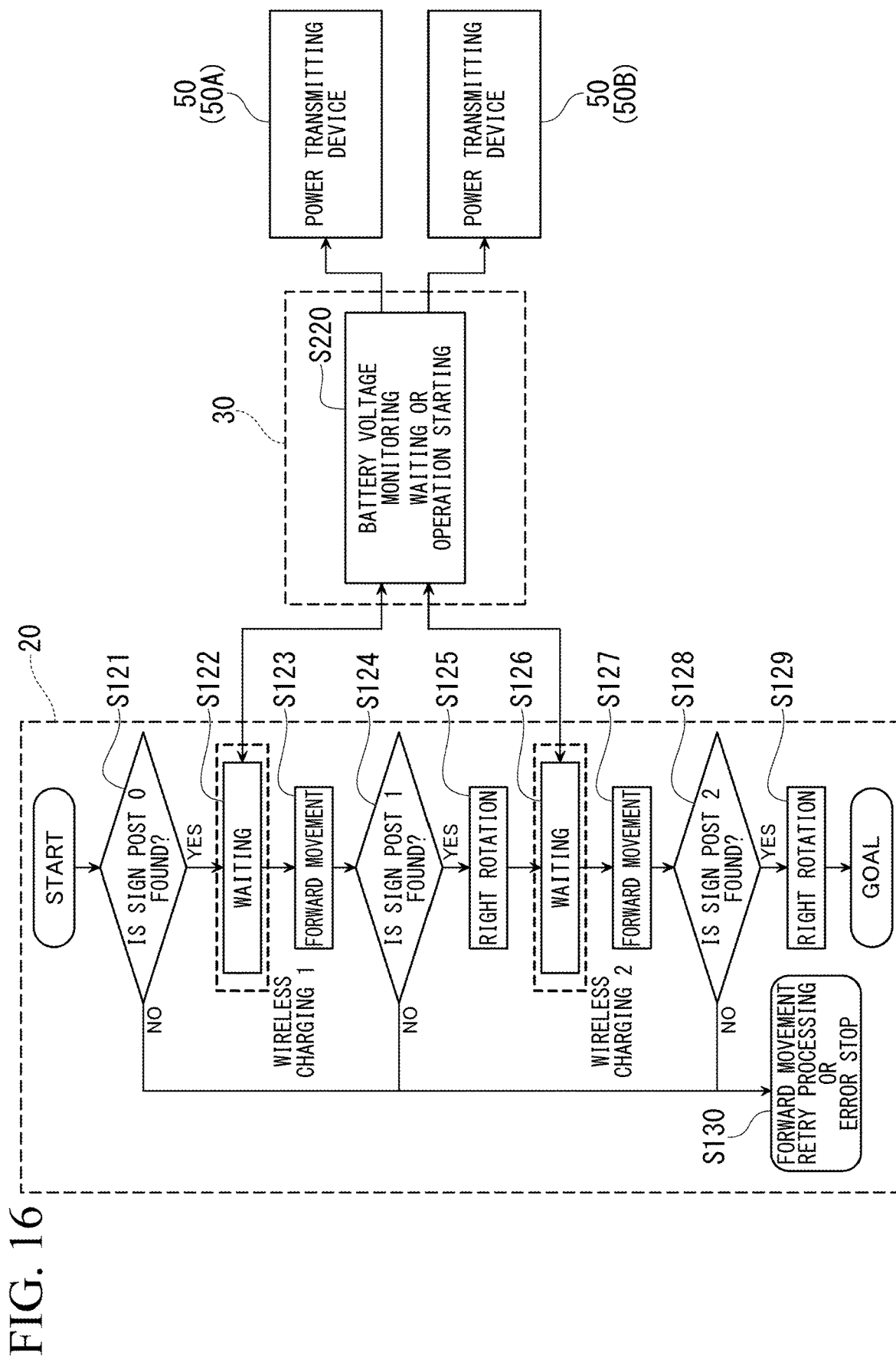
FIG. 16 is a flowchart showing an operation example of the autonomous mobile robot linkage system based on the operation table shown in FIG. 15.

FIG. 15 is a diagram showing an operation table of the autonomous mobile robot in the third embodiment of the present invention. FIG. 16 is a flowchart showing an operation example of the autonomous mobile robot linkage system 1 based on the operation table shown in FIG. 15.

First, the autonomous mobile robot 20 positioned at a start point A shown in FIG. 14 moves forward upon receipt of a "forward movement" event issued by the host device based on the operation table shown in FIG. 15. A communication unit 24 serially communicates this operation number "0" to the host device 30.

Next, the autonomous mobile robot 20 performs a predetermined operation set to the next operation number "1." The "operation" set to the operation number "1" is detection of the "sign post." The "sign post" detected here has a "sign post size" of "M," a "sign post No." of "0," a "following direction" of the "front," a "sign post left-right distance" of "0," and a "sign post front-rear distance" of "2."

Specifically, a detection target of the autonomous mobile robot 20 is the sign post SP0 having a sign post size of M (other sizes such as S and L can be set). Further, the following direction of the autonomous mobile robot 20 with respect to the sign post SP0 (the direction of travel that satisfies the above-described predetermined condition) is the front (a forward direction), and the sign post left-right distance is 0 (0 with respect to the above-described Xref (see FIG. 4)), and the sign post front-rear distance is 2 meters (the above-described Z (see FIG. 4) which is a switching distance of the sign post).

In a case where the sign post SP0 is found (YES in step S121), the communication unit 24 serially communicates this operation number "1" to the host device 30. Next, the autonomous mobile robot 20 performs a predetermined operation set to an operation number "2." The "operation" set to the operation number "2" is "waiting" (step S122). The communication unit 24 serially communicates this operation number "2" to the host device 30.

In a case where the sign post SP0 could not be found (NO in step S121 (similarly NO in step S124 and NO in step S128, which is described later)), the autonomous mobile robot 20 performs retry processing of the forward movement or outputs an error message to stop (step S130).

When the host device 30 receives the operation number "2," the host device 30 executes command analysis based on the operation number. Then, the host device 30 generates an event (wireless charging control 1) for performing contactless power supply from a power transmitting device 50A to the autonomous mobile robot 20 waiting in front of the sign post SP0 based on the operation number "2." (step S220). The power transmitting device 50A receives a command from the host device 30 and starts power transmission.

The autonomous mobile robot 20 monitors a voltage of the battery and automatically proceeds to the next step when the voltage of the battery exceeds a predetermined set value. The set value of the battery may be set using GUI shown in FIG. 15. The host device 30 stops power transmission from the power transmitting device 50A when the autonomous mobile robot 20 proceeds to the next step.

The autonomous mobile robot 20 performs a predetermined operation set to an operation number "3" as the next step after the operation number "2." The "operation" set to the operation number "3" is "forward movement" (step S123). The parameter of the "operation" for this forward movement is "2." That is, the autonomous mobile robot moves forward by 2 meters. The communication unit 24 serially communicates this operation number "3" to the host device 30.

Next, the autonomous mobile robot 20 performs a predetermined operation set to an operation number "4." The "operation" set to the operation number "4" is detection of the "sign post." The "sign post" detected here has a "sign post size" of "M," a "sign post No." of "1," a "following direction" of the "front." a "sign post left-right distance" of "0," and a "sign post front-rear distance" of "2." In a case where the sign post SP1 is found (YES in step S124), the communication unit 24 serially communicates this operation number "4" to the host device 30.

Next, the autonomous mobile robot 20 performs a predetermined operation set to an operation number "5." The "operation" set to the operation number "5" is "rotation." The parameter of the "operation" for this rotation is "right rotation." and the parameter of the "rotation angle" is "90" degrees. That is, as shown in FIG. 14, the autonomous mobile robot 20 rotates right by 90 degrees (step S125). The communication unit 24 serially communicates this operation number "5" to the host device 30.

Next, the autonomous mobile robot 20 performs a predetermined operation set to an operation number "6." The "operation" set to the operation number "6" is "waiting" (step S126). The communication unit 24 serially communicates this operation number "6" to the host device 30.

When the host device 30 receives the operation number "6," the host device 30 executes command analysis based on the operation number. Then, the host device 30 generates an event (wireless charging control 2) for performing contactless power supply from a power transmitting device 50B to the autonomous mobile robot 20 waiting in front of the sign post SP1 based on the operation number "6." (step S220). The power transmitting device 50B receives a command from the host device 30 and starts power transmission.

The autonomous mobile robot 20 monitors a voltage of the battery and automatically proceeds to the next step when the voltage of the battery exceeds a predetermined set value. The host device 30 stops power transmission from the power transmitting device 50B when the autonomous mobile robot 20 proceeds to the next step.

The autonomous mobile robot 20 performs a predetermined operation set to an operation number "7" as the next step after the operation number "6." The "operation" set to the operation number "T" is "forward movement" (step S123). The parameter of the "operation" for this forward movement is "2." That is, the autonomous mobile robot moves forward by 2 meters. The communication unit 24 serially communicates this operation number "7" to the host device 30.

Next, the autonomous mobile robot 20 performs a predetermined operation set to an operation number "8." The "operation" set to the operation number "8" is detection of the "sign post." The "sign post" detected here has a "sign post size" of "M." a "sign post No." of "2," a "following direction" of the "front," a "sign post left-right distance" of "0," and a "sign post front-rear distance" of "2." In a case where the sign post SP2 is found (YES in step S128), the communication unit 24 serially communicates this operation number "8" to the host device 30.

Further, in a case where the sign post SP2 is found (YES in step S128), the autonomous mobile robot 20 performs a predetermined operation set to an operation number "9." The "operation" set to the operation number "9" is "rotation." The parameter of the "operation" for this rotation is "right rotation," and the parameter of the "rotation angle" is "180" degrees. That is, as shown in FIG. 1, the autonomous mobile robot 20 rotates right by 180 degrees (reverses) at the goal point B (step S129). The communication unit 24 serially communicates this operation number "9" to the host device 30.

A predetermined operation set to the next operation number "10" is "goal." The communication unit 24 serially communicates this operation number "10" to the host device 30. When the host device 30 receives the operation number "10," the host device generates an event for informing a voice speaker (not shown) of the goal of the autonomous mobile robot 20 as in the embodiments described above.

In this way, a series of operations of the autonomous mobile robot linkage system 1 in the situation shown in FIG. 14 are completed.

In this way, according to the third embodiment described above, the autonomous mobile robot 20 includes the power receiving device 51, the power transmitting device 50 that is provided on the travel path 10 and preforms contactless power supply to the power receiving device 51, is provided as a linkage device linked to the autonomous mobile robot 20, the host device 30 generates an event for starting or stopping power supply from the power transmitting device 50 based on the operation number of the autonomous mobile robot 20. According to this configuration, it is possible to automatically start power supply when the autonomous mobile robot 20 (the power receiving device 51) moves to a position facing the power transmitting device 50, and it is possible to automatically stop power supply when the autonomous mobile robot 20 proceeds to the next step.

The power transmitting device 50 may be installed not only in the middle of the travel path 10 but also at the start point A or the goal point B. In addition, if the voltage of the battery of the autonomous mobile robot 20 does not exceed the set value after a certain period of time has passed from the starting of power supply, the host device 30 generates an error in power supply and may proceed the autonomous mobile robot 20 to the next step or may stop the autonomous mobile robot 20.

Although preferred embodiments of the present invention have been described above with reference to the drawings, the present invention is not limited thereto. The various shapes and combinations of the constituent members shown in the above-described embodiment are examples and can be diversely changed based on design requirements and the like without departing from the objective of the present invention.

For example, in the above-described embodiments, a mode in which the host device 30 generates an event for controlling the linkage device based on the operation number of the autonomous mobile robot 20 with respect to the linkage device positioned on the travel path 10 or near the travel path 10 is described. This linkage device is not limited to the shutter device 40, the autonomous mobile robots 20A and 20B (the second autonomous mobile robots), and the power transmitting device 50 described above. For example, the linkage device may be a conveyor device that delivers a load of the autonomous mobile robot 20. In this case, an event to be generated can be similarly set from the GUI described above as well.

Further, for example, in the above-described embodiments, a mode in which an event is generated with the autonomous mobile robot 20 and the host device 30 linked to each other is described, but a mode in which the autonomous mobile robot 20 independently generates an event is also possible.

That is, this autonomous mobile robot linkage system 20 is an autonomous mobile robot 20 that moves along the travel path 10 while reading the plurality of sign posts SP disposed along the travel path 10 in order using a camera and performs predetermined operations in order of pre-set operation numbers based on identification numbers read from the sign posts SP and may include an event generating unit that generates an event on the travel path 10 based on the operation number being executed. This event generating unit corresponds to, for example, a communication device that issues a command to the shutter device 40 or the like.

INDUSTRIAL APPLICABILITY

According to the autonomous mobile robot linkage system and the autonomous mobile robot described above, it is possible to generate an event on a movement path at an arbitrary timing without requiring advanced knowledge or complicated effort.

REFERENCE SIGNS LIST

1 Autonomous mobile robot linkage system
10 Travel path
20 Autonomous mobile robot
20A Autonomous mobile robot (second autonomous mobile robot, linkage device)
20B Autonomous mobile robot (second autonomous mobile robot, linkage device)
20L Drive wheel
20R Drive wheel
21 Sign post detection unit
22 Drive unit
23 Control unit
24 Communication unit
25 Irradiation part
26 Image capturing part
27 Calculation part
28 Motor control part
29 Motor
30 Host device
40 Shutter device (linkage device)
50 Power transmitting device (linkage device)
51 Power receiving device
A Start point
B Goal point
C, C1, C2 Detection target portion
C11, C13, C22, C31, C33 First cell
C12, C21, C23, C32 Second cell
SP, SP0, SP1, SP2 Sign post (sign)

The invention claimed is:

1. An autonomous mobile robot linkage system comprising:
a plurality of signs disposed along a travel path;
an autonomous mobile robot which moves along the travel path while reading the plurality of signs in order using a camera and performs predetermined operations in order of pre-set operation numbers based on identification numbers read from the signs; and
a host controlling circuitry which receives information on the operation number being executed from the autonomous mobile robot and generates an event on the travel path based on the operation number,
wherein the operation number is accompanied by an index number relating to a going path and a returning path of the travel path.

2. The autonomous mobile robot linkage system according to claim 1, wherein the host controlling circuitry generates an event on the travel path before the autonomous mobile robot reaches each of the signs read by the autonomous mobile robot.

3. The autonomous mobile robot linkage system according to claim 1,
wherein each of the signs includes a detection target portion in which a first cell that is able to reflect light and a second cell that is not able to reflect light are disposed on a two-dimensional plane, and
wherein the autonomous mobile robot includes:
an image capturing part that captures an image of the reflected light from the detection target portion with a camera,
a calculation part that reads the identification numbers of the signs based on the image data captured by the image capturing part,
a control unit that executes operations in order of the operation numbers based on the identification numbers, and
a communication unit that communicates the operation number being executed by the control unit to the host controlling circuitry.

4. The autonomous mobile robot linkage system according to claim 1,
wherein the host controlling circuitry grasps position information on the autonomous mobile robot from the operation number being executed in the autonomous mobile robot.

5. The autonomous mobile robot linkage system according to claim 1,
wherein an operation table stores an STEP input sequence in which the autonomous mobile robot performs the predetermined operations in order of the pre-set operation numbers, and
the operation table is stored in each of the autonomous mobile robot and the host controlling circuitry.

6. The autonomous mobile robot linkage system according to claim 1, further comprising:
an event generator positioned on the travel path or near the travel path,
wherein the host controlling circuitry generates an event for controlling the event generator based on the operation number being executed.

7. The autonomous mobile robot linkage system according to claim 6, further comprising:
a shutter which is provided on the travel path as the event generator,
wherein the host controlling circuitry generates an event for opening or closing the shutter based on the operation number.

8. The autonomous mobile robot linkage system according to claim 6,
wherein an intersection is provided on the travel path,
wherein the autonomous mobile robot linkage system further comprises a second autonomous mobile robot which moves along the travel path as the event generator, and
wherein the host controlling circuitry generates an event for pausing entry of the second autonomous mobile robot into the same intersection together with the autonomous mobile robot, and having the second autonomous mobile robot enter the intersection after the host controlling circuitry detects that the autonomous mobile robot has passed through the intersection, based on the operation number.

9. The autonomous mobile robot linkage system according to claim 6,
- wherein the autonomous mobile robot includes a power receiving device,
- wherein the autonomous mobile robot linkage system further comprises a power transmitting device which is provided on the travel path and supplies power to the power receiving device without direct contact as the event generator, and
- wherein the host controlling circuitry generates an event for starting and stopping power supply of the power transmitting device based on the operation number.

10. An autonomous mobile robot which moves along a travel path while reading each sign of a plurality of signs disposed along the travel path and containing information on identification numbers in order using a camera and performs predetermined operations in order of pre-set operation numbers based on the identification numbers read from each of the signs, the autonomous mobile robot comprising:
- a communicator which generates an event for controlling an event generator positioned on the travel path or near the travel path based on the operation number being executed,
- wherein the operation number is accompanied by an index number relating to a going path and a returning path of the travel path.

* * * * *